(12) United States Patent
Ronchi et al.

(10) Patent No.: US 11,542,996 B2
(45) Date of Patent: Jan. 3, 2023

(54) BRAKING BAND OF A DISC FOR DISC BRAKE OF VENTILATED TYPE

(71) Applicant: FRENI BREMBO S.P.A., Bergamo (IT)

(72) Inventors: Nino Ronchi, Curno (IT); Antonio Quarti, Curno (IT); Lorenzo Cavagna, Curno (IT); Fabiano Carminati, Curno (IT)

(73) Assignee: Freni Brembo S.p.A., Bergamo (IT)

( * ) Notice: Subject to any disclaimer, the term of this patent is extended or adjusted under 35 U.S.C. 154(b) by 0 days.

(21) Appl. No.: 16/474,222

(22) PCT Filed: Dec. 18, 2017

(86) PCT No.: PCT/IB2017/058034
§ 371 (c)(1),
(2) Date: Jun. 27, 2019

(87) PCT Pub. No.: WO2018/122668
PCT Pub. Date: Jul. 5, 2018

(65) Prior Publication Data
US 2019/0353216 A1  Nov. 21, 2019

(30) Foreign Application Priority Data
Dec. 29, 2016 (IT) .................. 102016000132400

(51) Int. Cl.
*F16D 65/00* (2006.01)
*F16D 65/12* (2006.01)
*F16D 65/02* (2006.01)

(52) U.S. Cl.
CPC .... *F16D 65/128* (2013.01); *F16D 2065/1328* (2013.01)

(58) Field of Classification Search
CPC ............... F16D 65/128; F16D 65/84; F16D 2065/1328; F16D 2065/788
See application file for complete search history.

(56) References Cited

U.S. PATENT DOCUMENTS 3,899,054 A  8/1975  Huntress et al.
4,529,079 A  7/1985  Albertson
(Continued)

FOREIGN PATENT DOCUMENTS

CN  102177360 A  9/2011
CN  103016578 A  4/2013
(Continued)

OTHER PUBLICATIONS

European Patent Office, International Search Report and Written Opinion in Application No. PCT/IB2017/058034, dated Apr. 5, 2018, 12 pages, Rijswijk, Netherlands.
(Continued)

*Primary Examiner* — Melody M Burch
(74) *Attorney, Agent, or Firm* — Marshall & Melhorn, LLC (57) ABSTRACT

Some pin elements may have a substantially circular cross section, forming a circumference-shaped edge. Other pin elements may have a substantially rhomboidal cross section, forming a symmetric rhombus-shaped edge with respect to a radial direction and a circumferential direction orthogonal to this radial direction. Yet other pin elements may have a substantially circular cross section, forming a circumference-shaped edge.

15 Claims, 6 Drawing Sheets

(56) References Cited

U.S. PATENT DOCUMENTS

| | | | |
|---|---|---|---|
| 4,865,167 A | 9/1989 | Giorgetti et al. | |
| 4,928,798 A | 5/1990 | Watson et al. | |
| 5,542,503 A | 8/1996 | Dunn et al. | |
| 6,152,270 A | 11/2000 | Giorgetti | |
| 6,161,661 A * | 12/2000 | Pahle | F16D 65/123 188/218 XL |
| 7,066,306 B2 * | 6/2006 | Gavin | F16D 65/12 188/218 XL |
| 2004/0124047 A1 * | 7/2004 | Oberti | B22C 7/06 188/218 XL |
| 2004/0207108 A1 | 10/2004 | Pacchiana | |
| 2006/0105131 A1 | 5/2006 | Hasegawa et al. | |
| 2011/0108378 A1 * | 5/2011 | Leone | F16D 65/128 188/218 XL |
| 2013/0284547 A1 * | 10/2013 | Pipilis | F16D 65/128 188/218 XL |
| 2014/0151167 A1 | 6/2014 | Ronchi et al. | |
| 2017/0002879 A1 * | 1/2017 | Maronati | F16D 65/128 |

FOREIGN PATENT DOCUMENTS

| | | | |
|---|---|---|---|
| CN | 103562586 A | | 2/2014 |
| DE | 2505205 A1 | | 1/1976 |
| DE | 2822379 A1 | | 11/1979 |
| DE | 3241549 A1 | | 5/1984 |
| DE | 3527577 A1 | | 2/1987 |
| DE | 4210448 A1 | | 10/1993 |
| DE | 4210449 A1 | | 10/1993 |
| DE | 19819425 A1 | * 6/1999 | ........... F16D 65/128 |
| EP | 0077433 A1 | | 4/1983 |
| EP | 0082786 A1 | | 6/1983 |
| EP | 0318687 A2 | | 6/1989 |
| EP | 0989321 A2 | | 3/2000 |
| EP | 2378153 A1 | | 10/2011 |
| JP | 2000274463 A | | 10/2000 |
| JP | 2000274463 A | * | 10/2000 |
| WO | 2006105131 A2 | | 10/2006 |

OTHER PUBLICATIONS

The China National Intellectual Property Admiistration, First Notification of Office Action in Application No. CN 201780084872.2, dated May 6, 2020, 10 pages.

* cited by examiner

(TANGENTIAL RELATIVE VELOCITY at 130Km/h)

FIG. 6

(HEAT TRANSFER COEFFICIENT at 130Km/h)

FIG. 7
(AIR TEMPERATURE at 130km/h)

FIG. 8
(VORTICITY at 130km/h)

FIG. 9

(STATE OF THE ART)

FIG. 10

(STATE OF THE ART)

BRAKING BAND OF A DISC FOR DISC BRAKE OF VENTILATED TYPE

FIELD OF THE INVENTION

The present invention relates to a braking band of a disc for disc brake of ventilated type.

BACKGROUND ART

As known, the discs for disc brakes comprise a bell, from which an annular portion extends, referred to as a braking band intended to cooperate with pads of a caliper. In the case of discs of the ventilated type, the braking band is made by means of two plates, facing and connected to each other by means of connecting elements, e.g. in the form of pins or pillars and/or of elongated elements or fins. The other surfaces of the two plates define opposite braking surfaces, while the inner surfaces delimit, together with the pins or the fins, a ventilation channel for cooling the disc, being crossed by the air according to a centrifugal direction during the rotation motion of the disc itself.

It is known that the braking action provided by the pads against the braking surfaces of the disc generate heat, therefore an increase of temperature to the extent of making the disc itself incandescent in the case of particularly demanding performance. Due to the high temperature reached by the disc during braking, the disc is deformed and the contact between the pads and the braking surfaces deteriorates. Furthermore, the friction material of the pads undergoes a sort of vitrification and pollution by the disc material.

Furthermore, it has been found that the highest temperature is reached in a central annular portion of the braking surfaces, i.e. in a central annular portion of the outer surface of the respective plates. During the life of the disc, such a zone is easily subject to the formation of breakages, referred to as cracks.

In order to avoid the drawbacks presented above, the need is thus particularly felt in the sector to increase the efficiency of the heat dispersion generated by the braking, so as to contain the temperatures reached by the disc during and after braking.

For example, solutions are known from documents U.S. Pat. No. 4,865,167, DE4210449, EP0989321, EP0318687, U.S. Pat. Nos. 6,152,270, 5,542,503, US2004207108, WO2006105131, U.S. Pat. Nos. 3,899,054, 4,928,798, EP0077433, DE3527577, DE4210448, DE2505205, DE3241549, DE2822379, U.S. Pat. No. 4,529,079, EP0082786, FR2620499, EP0109035, U.S. Pat. No. 5,429,214, US2015021128, US2014151167, US2012255821, WO2011058594, US2008302615, WO2007117624, U.S. Pat. No. 6,145,636.

However, these known solutions attempt to solve different needs and do not provide geometries capable of effectively cooling the braking band and of avoiding excessive weakening of the structure of the disc which could imply the onset of cracks. Particularly, the known solutions do not provide improved cooling efficacy and an optimal resistance to the onset of cracks at the same time, the overall mass of the braking face being equal.

The problem underlying the present invention is that of suggesting a braking band of a disc for disc brake of the ventilated type which has such structural and functional features so as to meet the aforesaid while avoiding the drawbacks shown above with reference to the prior art.

The aforesaid needs can be met by virtue of the embodiments of the claimed braking band. In particular, it is possible to have an effective cooling of the braking band with respect to the embodiments of the prior art (e.g. shown in FIGS. 9 and 10) while avoiding the onset of cracks.

Figure 9:
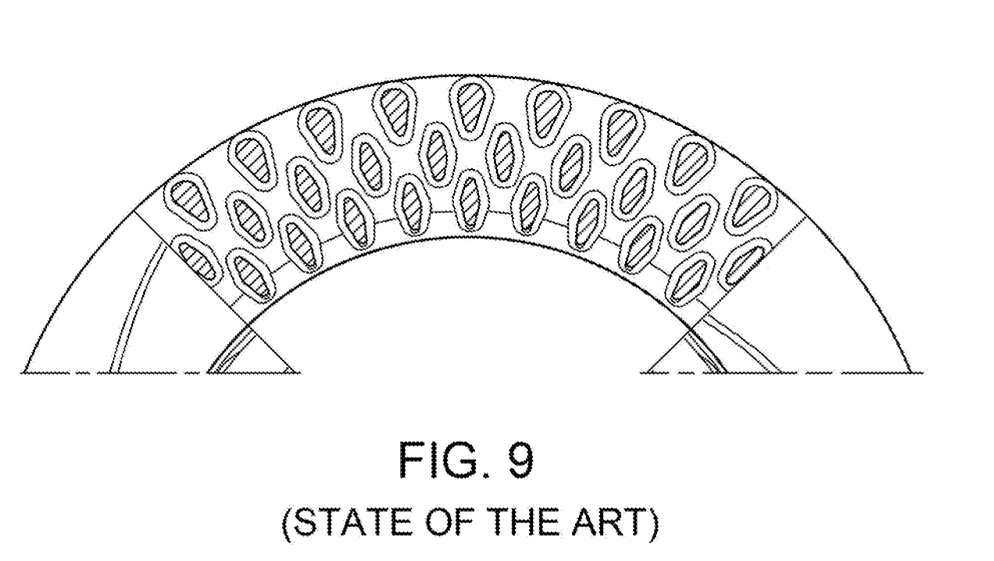
FIG. 9 shows a partially sectioned partial plan view of a disc according to the prior art.
Figure 10:
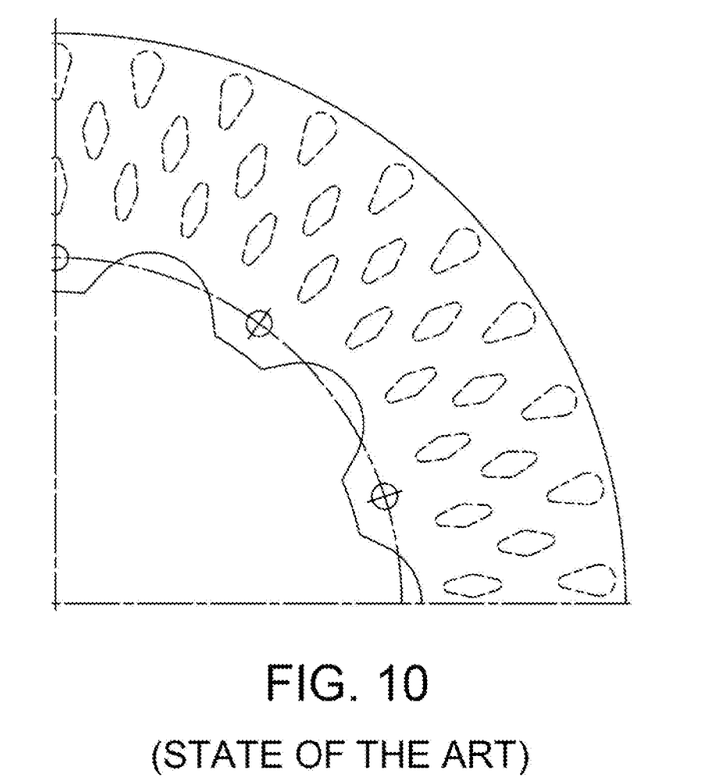
FIG. 10 shows a partial plan view of the disc in FIG. 9 with the cross sections of the pin elements shown by a broken line.

By virtue of the embodiments which will be described below, the heat exchange surface is increased (e.g. by 6.7% more than a solution as shown in FIGS. 9 and 10) and the heat transfer coefficient is increased (e.g. by 15% more than a solution as shown in FIGS. 9 and 10) in the ventilation pipe of the braking band.

By virtue of the embodiments which will be described below, the maximum peaks of the working temperatures of the braking band are reduced, the conditions of use being equal with respect to the solutions of the prior art (e.g. as shown in FIGS. 9 and 10).

By virtue of the embodiments which will be described below, the dissipated thermal power can be increased by 22.7% with respect to a solution of the prior art, as shown for example in FIGS. 9 and 10.

By virtue of the embodiments which will be described below, the aforesaid effects are obtained, the weight of the braking band being equal, e.g. the weight of a braking band as shown in FIGS. 9 and 10 being equal.

The known solutions can be applied to different types of braking bands and discs having braking bands made in one piece separate from the bell or in one piece with the bell, such as for road vehicles, off-road vehicles or commercial vehicles.

SOLUTION

Such a problem is solved by a braking band of a disc for disc brake of ventilated type, according to the claims.

DRAWINGS

Further features and advantages of the braking band of a disc for disc brake of ventilated type according to the invention will become apparent from the following description which shows preferred embodiments, given by way of indicative, non-limiting examples, with reference to the accompanying drawings, in which.

DESCRIPTION OF SOME PREFERRED EMBODIMENTS

In the following description, the expression "axial direction" or "axial" means any direction which is parallel to the direction of the rotation axis A-A of the braking band.

In the following description, the expression "circumferential direction" or "circumferential" means any circular direction along a circumference coaxial to the rotation axis A-A of the braking band.

The expression "radial direction" or "radial" means any direction orthogonal to the axial and radial direction with respect to the circumferential extension of the braking band.

The expression "pin element" means an element which protrudes from a plate of the braking band reaching and connecting the facing plate and also that its dimensions in radial and axial direction are similar, e.g. one may even be up to two and a half times the other; substantially, a pin element is a column element which joins the two plates leaving a ventilation channel between them, which forms passages which intersect by turning about the pin elements.

The expression "not circumferentially superimposing" means that two pin elements of two different ranks are arranged so as not to reach each other while traveling along a circumference. The expression "circumferentially superimposing" means that two pin elements are intersected traveling along a circumference.

The word "rank" or "row" or "line" means a set of pin elements arranged along the same circumference. According to an embodiment, the pin elements of a rank are distributed mutually uniformly along a circumference. According to an embodiment, the pin elements of a rank are all mutually equal. According to an embodiment, a rank is coaxial to the rotation axis A-A of the braking band.

The expression "cross section of a pin element" or "cross section" means the section traversal to the longitudinal extension of the pin element preferably on a flow plane of the fluid which flows in the ventilation pipe, e.g. the median plane in axial direction.

The expression "circular" means the shape of a cross section which delimits a circular area, preferably having a circumference-shaped cross section edge.

The word "drop" means the tapered shape of a cross section which delimits an area having rounded edges elongated in a direction, preferably but not necessarily radial R-R. According to an embodiment, the tip of the drop is also rounded. According to an embodiment, the drop extends in radial direction and the tip faces towards the rotation axis A-A of the braking band.

The word "rhombus" or "rhomboidal" means the shape of a cross section which delimits a parallelogram-shaped area with parallelogram-shaped area edge. Preferably, said area edges are rounded in which each side of the parallelogram is connected to the adjacent one by means of a connection radius. According to an embodiment, said parallelogram-shape is a rhombus. According to an embodiment, said parallelogram-shape is symmetric with respect to two orthogonal axes. According to an embodiment, said parallelogram-shape is a square. According to an embodiment, said parallelogram-shape has edges, e.g. rounded, facing towards the radial direction R-R and circumferential direction C-C.

The expression "T" or "tapered triangle" means the shape of a cross section which delimits an area shaped as an isosceles triangle with flat or slightly arched base. The sides of the triangle are preferably joined at the base and to one another. According to an embodiment, said shape is oriented by arranging the base facing towards the outside of the ventilation pipe so as to form a local tapering of the circumferential extension of the ventilation pipe. According to an embodiment, the isosceles-triangle-shape is symmetric with respect to an axis directed according to the radial direction R-R. According to an embodiment, the sides of the triangle are formed by rectilinear stretches which are mutually connected and converging so as to taper the triangle passing from the base to the vertex of the two sides. According to an embodiment, the sides of the triangle are formed by curvilinear stretches which are mutually connected and converging so as to taper the triangle passing from the base to the vertex of the two sides.

With reference to the aforesaid figures, reference numeral 2 indicates as a whole a disc for disc brake of ventilated type. Reference numeral 19 indicates a connection bell of the disc, e.g. to a stub axle of a vehicle, and reference numeral 1 indicates a braking band.

Reference A-A indicates an axis about which the disc turns. Direction axial to the disc or to the braking band means a direction parallel to axis A-A. Reference R-R, in the figures, generally indicates a direction radial to the disc or to the braking band, i.e. a direction perpendicular to the axial direction or the axis A-A. Finally, the direction tangential or circumferential to the disc C-C means a direction coinciding with a circumference having center on the axis A-A.

The braking band 1 extends between an inner diameter D1, near the rotation axis of the disc A-A, and an outer diameter D2, far from said rotation axis of the disc A-A.

The braking band comprises two plates 3 and 4 joined by connection means. According to a possible embodiment, the connection means are for example made in form of pins 8, 9, 10, 11, 12. A gap or ventilation pipe 7, divided into ventilation channels by the connection means, is defined between the two plates 3 and 4.

Of the two plates, reference numeral 4 indicates the one which is on the same part on which the bell 19 develops, with respect to a median plane of the gap between the two plates, while reference numeral 3 indicates the one which is on opposite part to the one on which the bell develops, with respect to the aforesaid median plane of the gap between the two plates.

According to a possible embodiment, the pins 8, 9, 10, 11, 12 are grouped in concentric ranks comprising an outer rank, arranged near the outer diameter D2 of the braking band 1, an inner rank, near the axis A-A of the disc, and intermediate ranks between the inner rank and the outer rank.

According to an embodiment, a braking band 1 of a disc for disc brake 2 of ventilated type comprises two plates (3, 4).

Said two plates 3, 4 are coaxial with the same rotation axis A-A.

Said two plates 3, 4 comprise two inner side surfaces 5, 6 which are arranged facing each other.

Said two inner side surfaces 5, 6 are mutually spaced apart forming a ventilation duct 7 for permitting a cooling air flow between the two plates 3, 4.

Said two plates 3, 4 are connected to each other at least by means of pin elements 8, 9, 10, 11, 12 which project from an inner side surface 5 of a first plate 3 to reach the facing inner side surface 6 of the facing plate 4.

Said pin elements 8, 9, 10, 11, 12 are a plurality of pin elements 8, 9, 10, 11, 12 distributed circumferentially in uniform manner to form circular rings, or rows, or ranks, forming a rank of inner pin elements 8 arranged closer to the rotation axis A-A, a rank of outer pin elements 12 arranged further from the rotation axis A-A, and intermediate ranks of pin elements 9, 10, 11.

The pin elements 8, 9, 10, 11, 12 of ranks arranged close to one another are circumferentially staggered so that, following a radial direction R-R, each pin element of any rank is located between two pin elements of the adjacent rank.

The pin elements 8, 9, 10, 11, 12 have a cross section in a median plane parallel to the fluid flow in the ventilation duct 7, as described below.

The pin elements 9, 10, 11 of the intermediate ranks comprise:

at least one rank of pin elements 9 of the intermediate ranks with pin elements 9 having a substantially circular cross section, forming a circumference-shaped cross section edge 14;

at least one further rank of pin elements 10 of the intermediate ranks with pin elements 10 having a substantially rhomboidal cross section, forming a rhombus-shaped cross section edge 15;

at least one further rank of pin elements 11 of the intermediate ranks with pin elements 11 having a substantially circular cross section, forming a circumference-shaped cross section edge 16;

According to an embodiment, all pin elements 9, 10, 11 of each intermediate rank are mutually equal in the same rank.

According to an embodiment, at least one further rank of pin elements 10 of the intermediate ranks with pin elements 10 having a substantially rhomboidal cross section, form an edge 15 having a symmetric rhombus-shaped cross section with respect to a radial direction R-R and a circumferential direction C-C orthogonal to this radial direction R-R.

According to an embodiment, at least one rank of pin elements 9 of the intermediate ranks has pin elements 9 with substantially circular cross section, forming an circumferential shaped edge 14 and at least one rank of pin elements 10, adjacent and radially external to the preceding rank of pin elements 9, has pin elements 10 with substantially rhomboidal cross section, forming a symmetric rhombus-shaped edge 15 with respect to a radial direction R-R and a circumferential direction C-C orthogonal to this radial direction R-R. Furthermore, at least one rank of pin elements 11, adjacent to the preceding rank of pin elements 10 and arranged even more radially outer, has pin elements 11 with a substantially circular cross section, forming a circumference-shaped edge 14.

According to an embodiment, at least one rank of pin elements 9 of the intermediate ranks or inner intermediate rank is placed near the rank of pin elements 8 arranged closer to the rotation axis A-A and has pin elements 9 with substantially circular cross section, forming a circumferential shaped edge 14. Furthermore, at least one adjacent rank of pin elements 10, or intermediate rank, placed radially outside the preceding rank of pin elements 9, has pin elements 10 with substantially rhomboidal cross section, forming a symmetric rhombus-shaped edge 15 with respect to a radial direction R-R and a circumferential direction C-C orthogonal to this radial direction R-R. Furthermore, at least one adjacent and even more radially outer rank of pin elements 11, or outer intermediate rank, is placed near the rank of pin elements 12 placed further from the rotation axis A-A, and has pin elements 11 with substantially circular cross section, forming a circumferential shaped edge 16.

According to an embodiment, said at least one further rank of pin elements 10 of the intermediate ranks with pin elements 10 having a substantially rhomboidal cross section, forms a symmetric rhombus-shaped cross section edge 15 with respect to a radial direction R-R passing through the middle line of this cross section, and symmetric with respect to a circumferential direction C-C orthogonal to this radial direction R-R and substantially passing through the middle line of this cross section.

According to an embodiment, said at least one further rank of pin elements 10 of the intermediate ranks with pin elements 10 having a substantially rhomboidal cross section forms a substantially rhombus-shaped cross section edge 15 having four flat sides connected by arcs of circumference.

According to an embodiment, said rank of inner pin elements 8 arranged closer to the rotation axis A-A has pin elements 8 with cross section with drop-shaped edge 13, with two mutually converging flat sides connected by arcs of circle, with a first wider set of arcs of circle which connects the diverging ends of the flat sides and a second opposite set of arcs of circle narrower than the first set which connects the converging ends of the flat sides.

According to an embodiment, said rank of outer pin elements 12 arranged further from the rotation axis A-A has pin elements 12 with cross section having a "T"-shaped, or "tapered triangle"-shaped, cross section edge 17, with a flat base and converging and arched flanks mutually connected by arcs of circle and connected in their diverging ends from the flat base with arcs of circle.

According to an embodiment, said outer pin elements 12 have an isosceles triangle-shaped cross section edge 17, with arcs of circle rounded edges, the flat base placed externally facing the ventilation duct 7 and the sides of the isosceles triangle formed by arcs of circle which taper the cross section with less than linear pattern.

According to an embodiment, said outer pin elements 12 have a cross section with triangular edge, with arc of circle rounded edges, the flat base placed externally facing the ventilation duct 7 and the concave curved sides of the triangle inside said cross section reducing the circumferential dimension formed by cross section moving away from said base.

According to an embodiment, all the pin elements 8, 9, 10, 11, 12 are distributed circumferentially and grouped in modules, said modules having a radial extension and having pin elements which are mutually staggered along the radial extension, each module comprising:

at least one pin element 8 with drop-shaped cross section edge 13;

at least one pin element 9 with circular cross section edge 14;

at least one pin element 10 with rhombus-shaped cross section edge 15;

at least one second pin element 11 with circular cross section edge 16;

at least one pin element 12 with tapered triangular cross section edge 17.

According to an embodiment, all the pin elements 8, 9, 10, 11, 12 are distributed circumferentially and grouped in modules, said modules having a radial extension and having pin elements which are mutually staggered along the radial extension, each module comprising:

a first pin element 8 with drop-shaped cross section edge 13 arranged radially more within or closer to the rotation axis A-A;

a second pin element 9 with adjacent and radially outermost circular cross section edge 14;

a third pin element 10 with adjacent and radially outermost rhombus-shaped cross section edge 15;

a fourth pin element 11 with adjacent and radially outermost circular cross section edge 16;

a fifth pin element 12 with adjacent and radially outermost tapered cross section edge 17.

According to an embodiment, the pin elements 8, 9, 10, 11, 12 are connected to the inner side surfaces 5, 6 of the plates 3, 4 by means of a connection 18 having a predetermined connection radius.

According to an embodiment, all the pin elements 8, 9, 10, 11, 12 are placed and develop remaining inside the ventilation duct 7.

According to an embodiment, the circumferential ranks on which the pin elements 8, 9, 10, 11, 12 are distributed have in their cross section a radial dimension and all the ranks of the pin elements 8, 9, 10, 11, 12 avoiding to circumferentially superimposed their dimension.

According to an embodiment, the circumferential ranks on which the pin elements 8, 9, 10, 11, 12 are distributed have in their cross section a radial dimension delimited by a circumferential envelop and all the ranks of the pin elements 8, 9, 10, 11, 12 are with their circumferential development radially tangent to one another.

According to an embodiment, any two adjacent ranks in which pin elements 8, 9, 10, 11, 12 are distributed have cross sections which can be inscribed in mutually tangent circumferences.

According to an embodiment, said ventilation duct 7 has a maximum extension in axial direction A-A variable between 10 mm and 20 mm, preferably of 15 mm.

According to an embodiment, said pin elements 8, 9, 10, 11, 12 are distributed on five ranks.

According to an embodiment, each rank of pin elements (8, 9, 10, 11, 12) includes thirty-seven pin elements distributed circumferentially.

According to an embodiment, any three of the adjacent ranks have a distribution of their pin elements 8, 9, 10, 11, 12 in a quincunx arrangement.

From the above, it can be appreciated that providing a braking band and a disc for disc brake according to the present invention unexpectedly allows to improve the thermal exchange efficiency, limiting the maximum temperatures in case of equal thermal stresses and allowing to support higher thermal stress, the maximum reached temperature being equal.

The distribution, number and shape of the pins constitutes to improving the thermal efficiency in the disc weight being equal with respect to the known discs.

The advantageous effects of the present invention were highlighted in some tests performed on a virtual test bend the results of which are shown in the figures from 5 to 8. Such tests simulate a flow of air which at a given distance from the disc has constant speed. Both the movement of the air and the heat generated during braking are simulated. The results are particularly useful for predicting the behavior of the disc on the real test bench and to compare discs of different configurations.

Figure 1:
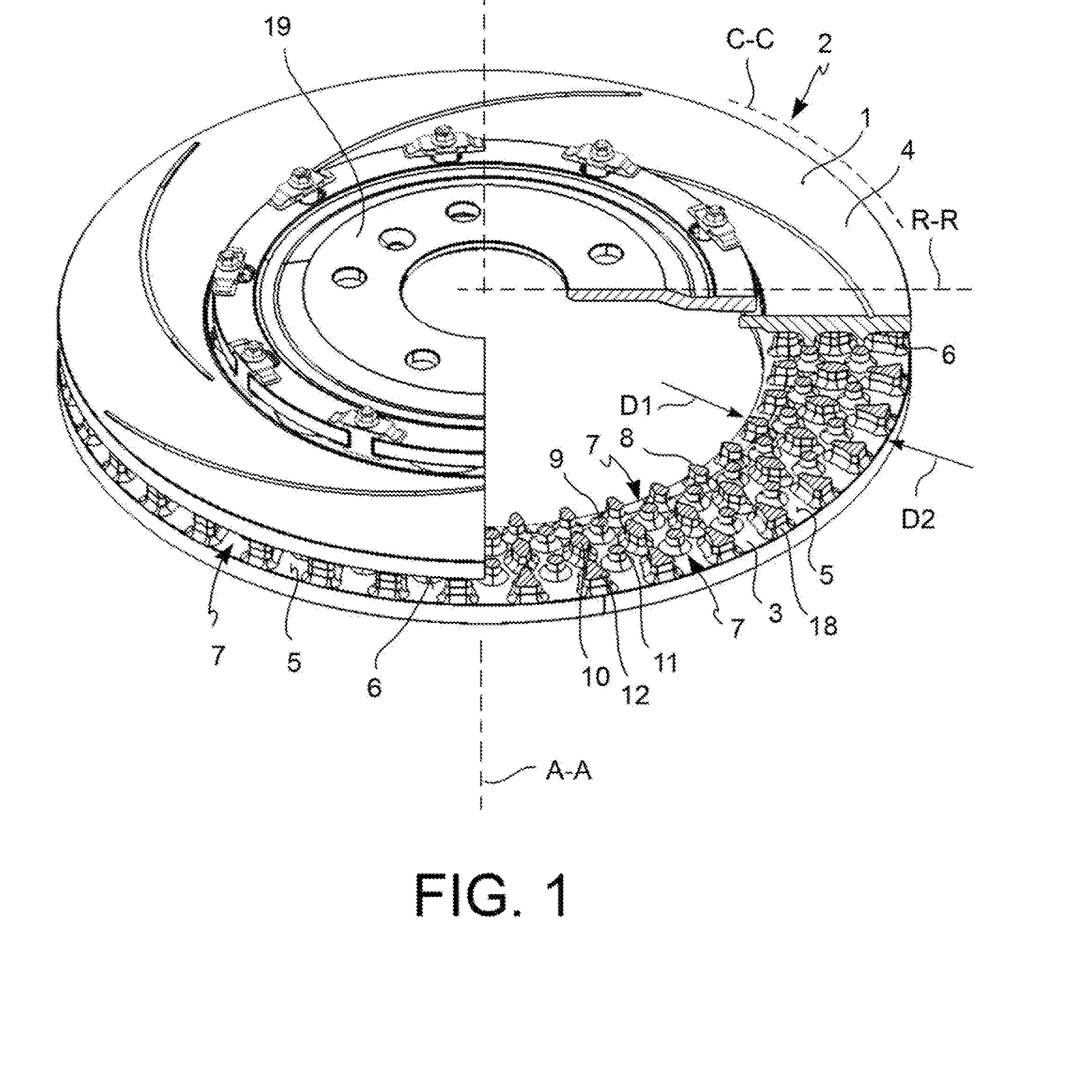
FIG. 1 shows a partially sectioned perspective view of a disc for disc brake according to the present invention.
Figure 2:
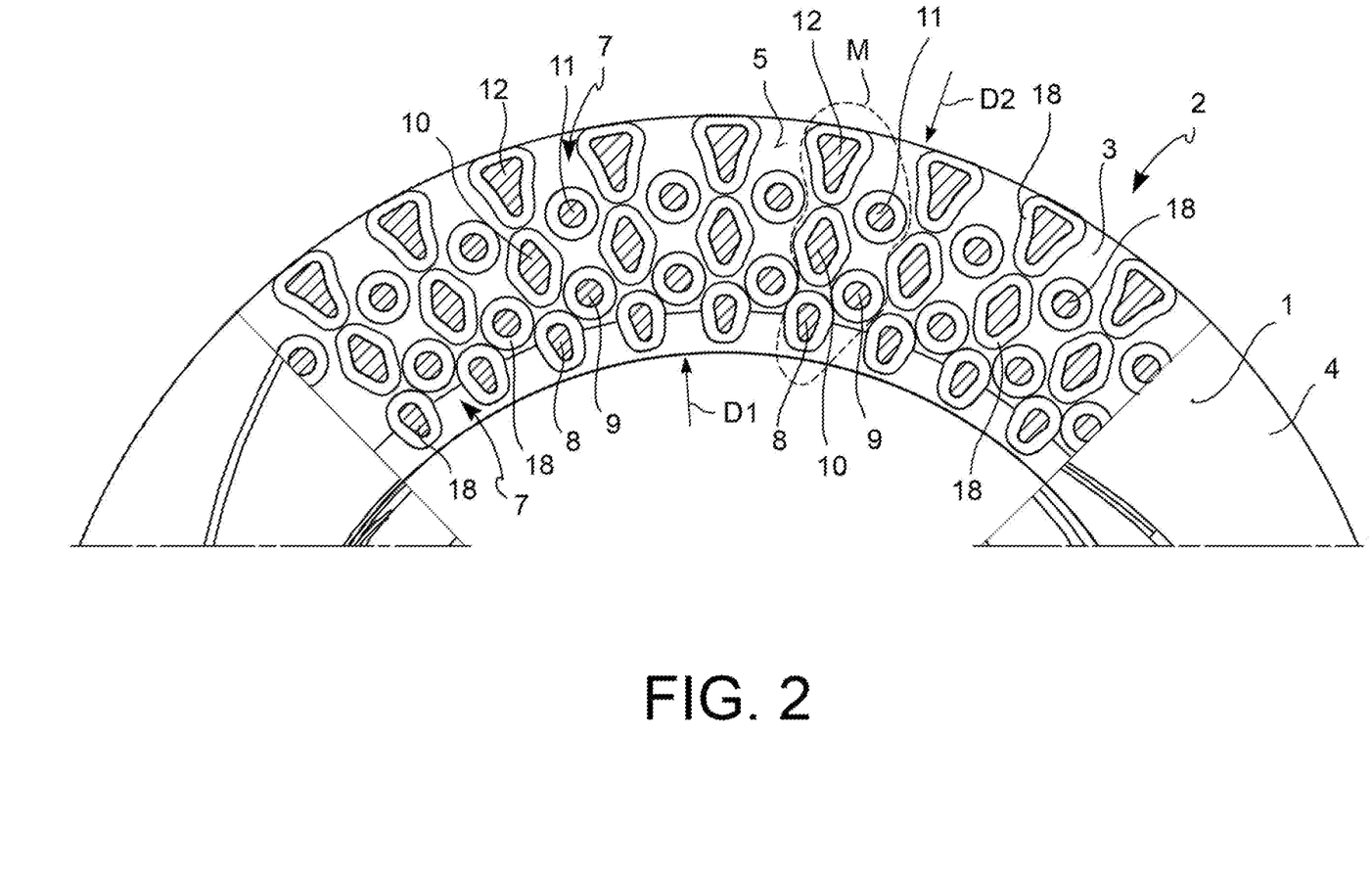
FIG. 2 shows a partially sectioned partial plan view of the disc for disc brake in FIG. 1.
Figure 3:
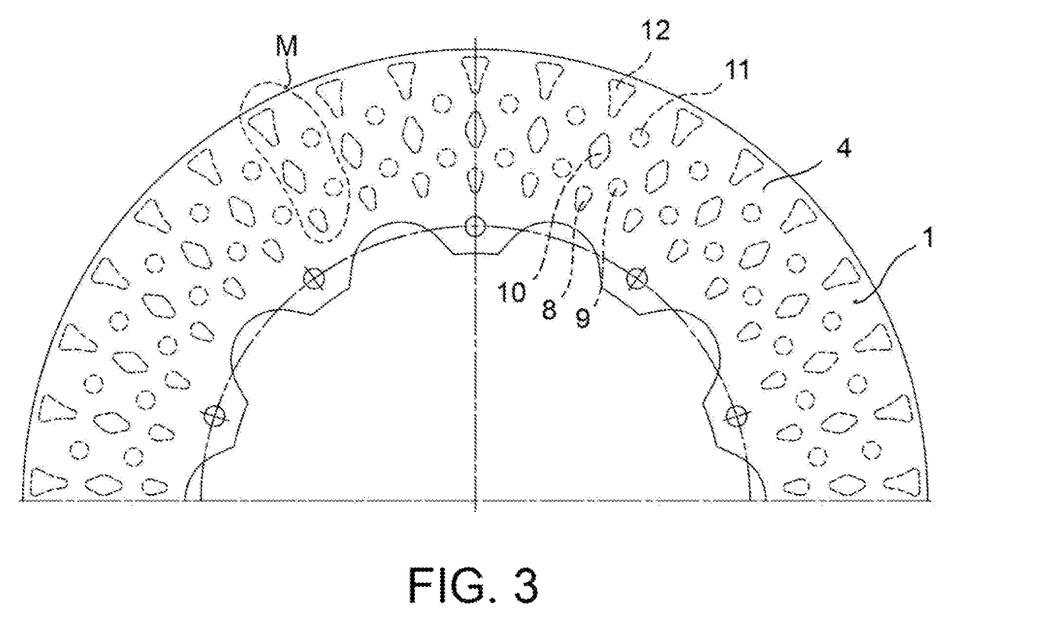
FIG. 3 shows a partial plan view of the disc in FIG. 1 in which the cross sections of the pin elements are shown by a broken line.
Figure 4:
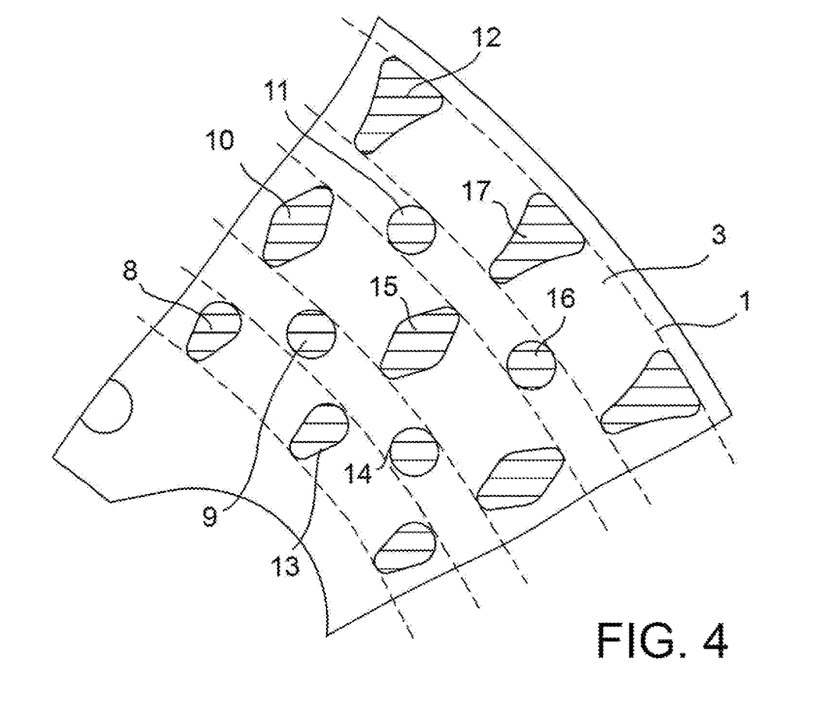
FIG. 4 shows an enlarged detail of disc in FIG. 1.
Figure 5:
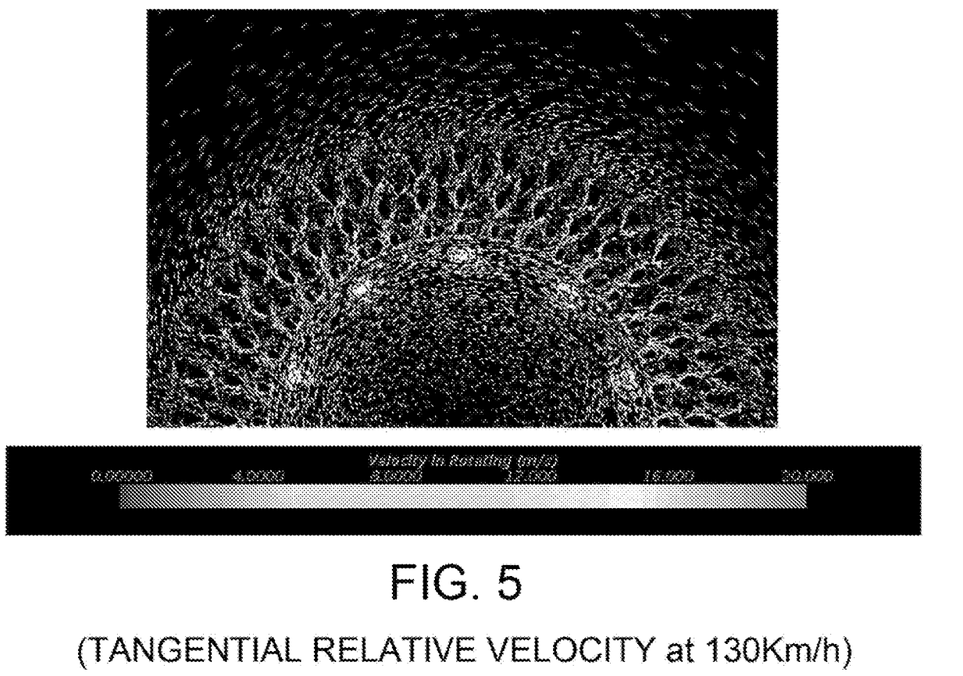
FIG. 5 shows the theoretic distribution results of the relative speed (motion field) at the band of the cooling air, when the vehicle has a traveling speed of 130 km/h.
Figure 6:
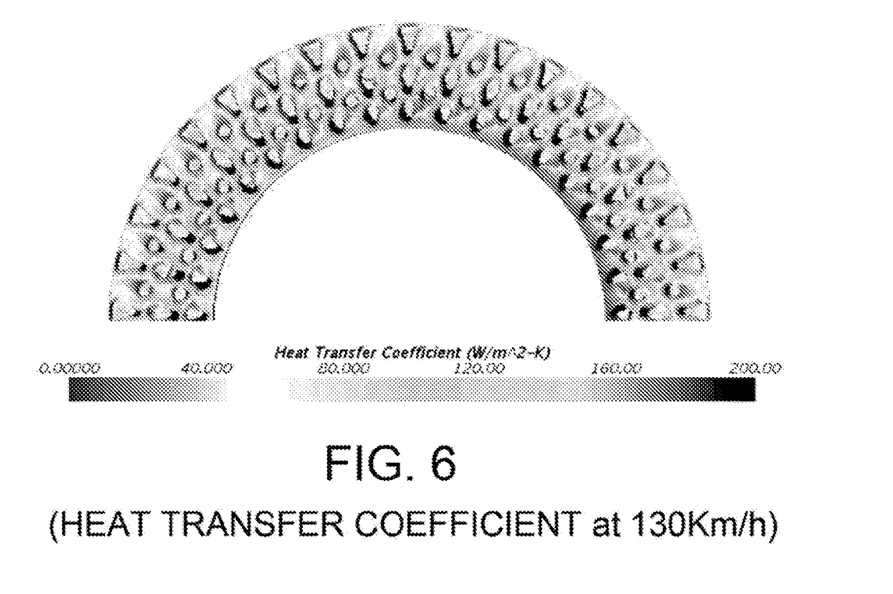
FIG. 6 shows the theoretical distribution results of the thermal exchange coefficient, when the vehicle has a traveling speed of 130 km/h.

In particular, FIG. 5 shows the motion field within the ventilation channels, i.e. the distribution of the air speeds in the ventilation channels.

Figure 7:
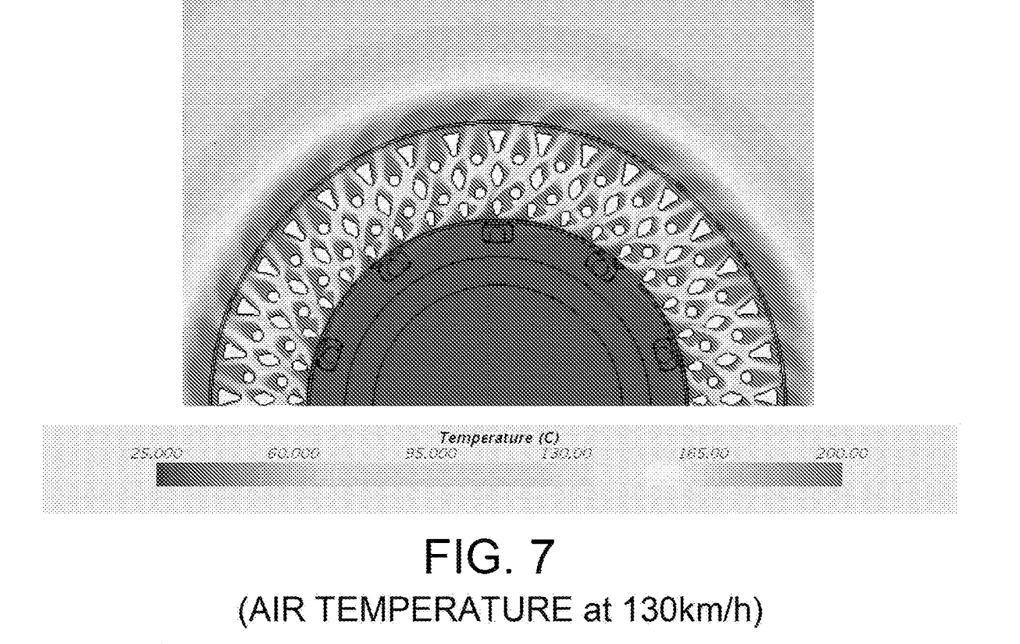
FIG. 7 shows the theoretical temperature distribution results in a disc for disc brake according to the invention.

FIG. 7 shows the distribution of the temperatures reached by the disc during the simulated braking from 130 km/h of equivalent vehicle speed. The zones are characterized by shades of gray and the respective temperature values are indicated (in degrees Centigrade).

Figure 8:
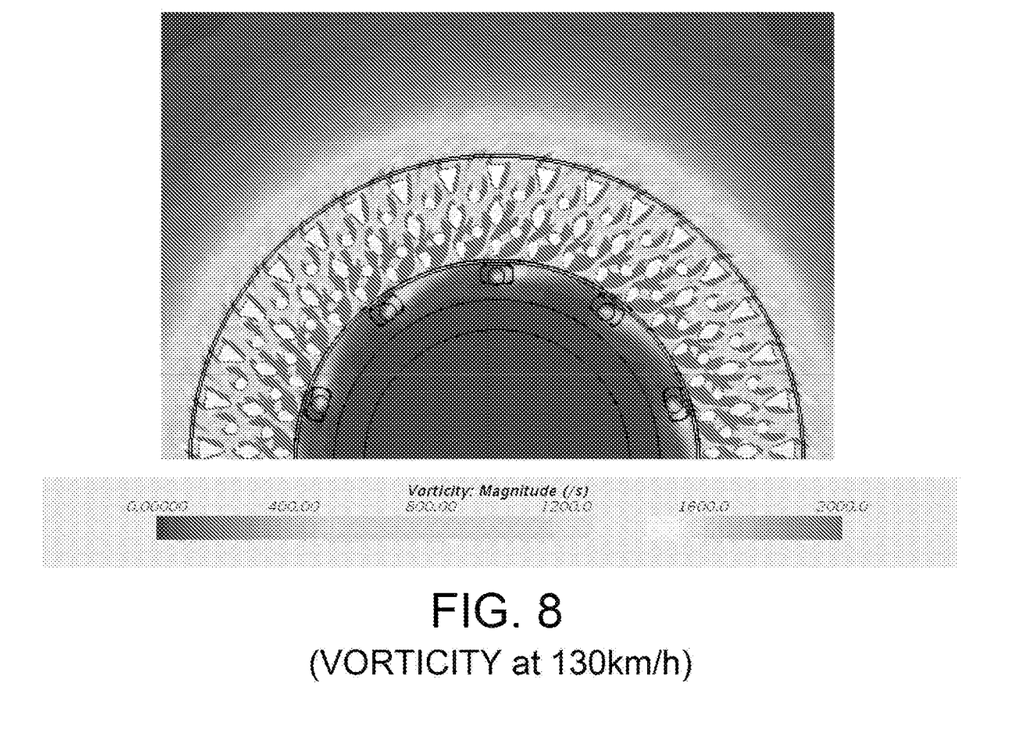
FIG. 8 shows the theoretical distribution results of a vortex triggers in the ventilation channels in a disc for disc brake according to the invention (vorticity)

FIG. 8 shows the vortex triggers in the air flow along the ventilation channels.

The advantageous provision of ventilation channels of modified geometries as described above allows to increase the air turbulence and to accelerate and address it in centrifugal direction.

The indicated effects are further consolidated by the advantageous shape of the pins, by the shape and the number of pins of the intermediate rank.

As can be seen in the figures, the air flow is addressed in direction radial to the disc and is considerably accelerated, whereby also obtaining a more regularly flow distribution. In particular, the shape of the pins does not obstruct the release of air, on the contrary it channels it and accelerates the flow. The zones or wakes, i.e. the ineffective zones for heat subtraction, are much smaller than in the prior art.

In the figures, it is apparent that many vortex triggers are widely distributed on the entire surface of the pins.

Furthermore, it has been found that the vortexes which are established display a high energy, contributing to generate a situation of turbulences which is particularly effective to remove heat.

The present invention thus allows to obtain more principles of turbulences and a greater mixing of the air flow contributing to increase the efficiency of the removal of heat generated during braking.

Such advantageous aspects are also highlighted by the fact that the temperature, in particular the maximum temperature of the outer central portion of the plates, is considerably lower, the thermal stress to which the disc is subjected being equal with respect to the known discs.

Firstly, the braking band according to the present invention allows the decrease of maximum temperature reached precisely in the point in which cracks occurs in the braking surface. This allows to either eliminate or delay the formation of cracks over time on the braking surface. Secondly, the decrease of the temperature of both the channel and the bell contribute to limiting the thermal deformation of the disc, in particular evaluated in direction parallel to the axis A-A of the disc.

From the above, it can be inferred that the shape of the intermediate ranks of pins contributes to further improving the heat exchange efficiency. Both the configuration and the arrangement and distribution of the pins of the intermediate ranks appear particularly effective.

In addition to the above, the advantageous shape of the pins of the outer rank allows the expansion of their base, the outer diameter of the disc and the dimension of the pin being equal, whereby avoiding the introduction of stones or detritus which would occlude the passage of air. Indeed, these discs are intended to be mounted in particular on means of transport, such as trucks or the like, above all intended to be used in inaccessible areas, such as for example construction sites.

It is apparent that variants and/or additions can be provided with respect to the description disclosed above.

The connection means between the two plates may consist of pins and other embodiments, such as micro-fins. Furthermore, other sections of the plane parallel to the air flow along the ventilation channel and/or other distribution are also possible.

The braking band may be in one piece with the bell and/or obtained independently and connected to it.

Those skilled in the art may make many changes and adaptations to the preferred constructional solution of the disc described above or can replace elements with others which are functionally equivalent in order to meet contingent needs without however departing from the scope of the following claims.

REFERENCES 1 braking band
2 disc for brake disc
3 plate not connected to bell
4 plate connected to bell
5 inner side surface of the plate not connected to bell
6 inner side surface of the plate connected to bell
7 ventilation duct
8 pin elements of the rank closer to rotation axis or inner or drop-shaped pin elements
9 pin elements of the inner rank closer to the rank closer to rotation axis or inner intermediate or circular pin elements
10 pin elements of the intermediate rank or intermediate or rhombus-shaped pin elements
11 pin elements of an inner rank closer to the rank further from the rotation axis or outer intermediate or circular pin elements
12 pin elements of the rank further from the rotation axis or outer or tapered triangle-shaped pin elements
13 edge of the pin elements of the inner rank closer to the rank closer to rotation axis
14 edge of the pin elements of the intermediate rank closer to the inner rank
15 edge of the intermediate pin elements
16 edge of the pin elements of the intermediate rank closer to the outer rank
17 edge of the pin elements of the rank further from the rotation axis
18 connection of the pin elements with the inner side surfaces of the plates
19 bell
A-A Rotation axis
R-R radial direction orthogonal to axis A-A
C-C circumferential direction orthogonal to A-A and R-R
D1 inner band diameter
D2 outer band diameter
M module

The invention claimed is:

1. A ventilated braking band of a disc for disc brake, wherein
said braking band comprises two plates;
said two plates are coaxial with a same rotation axis;
said two plates comprise two inner side surfaces which are arranged facing each other;
said two inner side surfaces are mutually spaced apart forming a ventilation duct for permitting a cooling air flow between the two plates;
said two plates are connected to each other via at least pin elements which project from an inner side surface of a first plate to reach the facing inner side surface of the facing plate;
said pin elements are a plurality of pin elements distributed circumferentially in uniform manner to form circular rings, or ranks, forming a rank of inner pin elements arranged closer to the rotation axis, a rank of outer pin elements arranged further from the rotation axis, and ranks of intermediate pin elements;
the pin elements of ranks arranged close to each other are circumferentially staggered so that, following a radial direction with respect to the rotation axis, each pin element of any rank is located between two pin elements of the adjacent rank;
the pin elements have a cross section in a median plane parallel to the fluid flow in the ventilation duct; wherein
the pin elements of the intermediate ranks comprise:
at least one first rank of pin elements of the intermediate ranks, closer to said rotation axis, with pin elements having a circular cross section at the median plane, forming a circumference-shaped cross section edge;
at least one second, further rank of pin elements of the intermediate ranks, external to said at least one first rank, with pin elements having a rhomboidal cross section at the median plane, forming a rhombus-shaped cross section edge;
at least one third further rank of pin elements of the intermediate ranks, external to said at least one second rank, with pin elements having a circular cross section at the median plane, forming a circumference-shaped cross section edge; and wherein
wherein outer radial edges of the pin elements of immediately adjacent ranks and the inner pin elements do not circumferentially overlap with inner radial edges of other pin elements of the ranks;
wherein outer radial edges of all the pin elements of said first rank of pin elements of the intermediate ranks, closer to said rotation axis, are tangent to a first circumference;
wherein inner radial edges of all the pin elements of said second further rank of pin elements of the intermediate ranks, external to said at least one first rank, are tangent to said first circumference;
wherein outer radial edges of all the pin elements of said second rank of pin elements of the intermediate ranks, are tangent to a second circumference;
wherein inner radial edges of all the pin elements of said third further rank of pin elements of the intermediate ranks, external to said at least one second rank, are tangent to said second circumference.

2. The braking band, according to claim 1, wherein
said at least one second, further rank of pin elements of the intermediate ranks with pin elements having the rhomboidal cross section, forms a symmetric rhombus-shaped cross section edge with respect to a radial direction passing through the middle line of this cross section, and symmetric with respect to a circumferential direction orthogonal to this radial direction and substantially passing through the middle line of this cross section;
and/or wherein
said at least one second, further rank of pin elements of the intermediate ranks with pin elements having the rhomboidal cross section forms a substantially rhombus-shaped cross section edge having four flat sides connected by arcs of circumference.

3. The braking band, according to claim 1, wherein
said rank of inner pin elements arranged closer to the rotation axis has pin elements with a cross section with a drop-shaped edge, with two mutually converging flat sides connected by arcs of circle, with a first wider set of arcs of circle which connects the diverging ends of the flat sides and a second opposite set of arcs of circle narrower than the first set which connects the converging ends of the flat sides.

4. The braking band, according to claim 1, wherein
said rank of outer pin elements arranged further from the rotation axis has pin elements with a cross section having a "T"-shaped, or "tapered triangle"-shaped, cross section edge, with a flat base and converging and arched flanks mutually connected by arcs of circle and connected in their diverging ends from the flat base with arcs of circle; and/or wherein said outer pin elements have an isosceles triangle-shaped cross section edge, with arcs of circle rounded edges, the flat base placed externally facing the ventilation duct and the sides of the isosceles triangle formed by arcs of circle which taper the cross section with less than linear pattern; and/or wherein said outer pin elements have a cross section with a triangular edge, with an arc of circle rounded edges, the flat base placed externally facing the ventilation duct and the concave curved sides of the triangle inside said cross section reducing the circumferential dimension formed by cross section moving away from said base.

5. The braking band, according to claim 1, wherein all the pin elements are distributed circumferentially and grouped in modules, said modules having a radial extension and having pin elements which are mutually staggered along the radial extension, each module comprising:

at least one pin element with a drop-shaped cross section edge;

at least one pin element with a circular cross section edge;

at least one pin element with a rhombus-shaped cross section edge;

at least a second element with a circular cross section edge;

at least one pin element with a tapered triangular cross section edge;

and/or wherein all the pin elements are distributed circumferentially and grouped in modules, said modules having a radial extension and having pin elements which are mutually staggered along the radial extension, each module comprising:

a first pin element with a drop-shaped cross section edge arranged radially more within or closer to the rotation axis;

a second pin element with adjacent and radially more outer circular cross section edge;

a third pin element with adjacent and radially more outer rhombus-shaped cross section edge;

a fourth pin element with adjacent and radially more outer circular cross section edge;

a fifth pin element with adjacent and radially more outer tapered cross section edge.

6. The braking band, according to claim 1, wherein the pin elements are connected to the inner side surfaces of the plates via a connection having a predetermined connection radius;

and/or wherein all the pin elements are placed and develop remaining inside the ventilation duct.

7. The braking band, according to claim 1, wherein the circumferential ranks in which the pin elements are distributed have a radial dimension in their cross section;

and/or wherein the circumferential ranks in which the pin elements are distributed have a radial dimension in their cross section delimited by a circumferential envelope; and all ranks of the pin elements are radially tangent to each other with their circumferential envelop;

and/or wherein two adjacent ranks in which pin elements are distributed have cross sections which can be inscribed in mutually tangent circumferences.

8. The braking band, according to claim 1, wherein said ventilation duct has a maximum extension in axial direction variable between 10 mm and 20 mm, including 15 mm.

9. The braking band, according to claim 1, wherein said pin elements are distributed on five ranks; and/or wherein each rank of pin elements includes thirty-seven pin elements distributed circumferentially; and/or wherein any three of the adjacent ranks have a distribution of their pin elements in a quincunx arrangement.

10. A ventilated braking band of a disc for a disc brake, wherein said braking band comprises two plates;

said two plates comprise two inner side surfaces which are arranged facing each other;

said two inner side surfaces are mutually spaced apart forming a ventilation duct for permitting a cooling air flow between the two plates;

said two plates are connected to each other via at least pin elements which project from an inner side surface of a first plate to reach the facing inner side surface of the facing plate;

said pin elements are a plurality of pin elements distributed circumferentially in uniform manner to form circular ranks, forming a rank of inner pin elements arranged closer to the rotation axis, a rank of outer pin elements arranged further from the rotation axis, and ranks of intermediate pin elements;

the pin elements of ranks arranged close to each other are circumferentially staggered so that, following a radial direction with respect to the rotation axis, each pin element of any rank is located between two pin elements of the adjacent rank;

the pin elements have a cross section in a median plane parallel to the fluid flow in the ventilation duct;

wherein the pin elements of the intermediate ranks comprise:

at least one first rank of pin elements of the intermediate ranks, closer to aid rotation axis, with pin elements having a circular cross section at the median plane, forming a circumference-shaped cross section edge;

at least one second further rank of pin elements of the intermediate ranks, external to said at least one first rank with pin elements having a rhomboidal cross section at the median plane, forming a rhombus-shaped cross section edge;

at least one third rank of pin elements of the intermediate ranks, external to said at least one second rank, with pin elements having a circular cross section at the median plane, forming a circumference-shaped cross section edge; wherein wherein outer radial edges of the pin elements of immediately adjacent ranks and inner pin elements do not circumferentially overlap with inner radial edges of other pin elements of the ranks;

wherein outer radial edges of all the pin elements of said first rank of pin elements of the intermediate ranks, closer to said rotation axis, are tangent to a first circumference;

wherein inner radial edges of all the pin elements of said second further rank of pin elements of the intermediate ranks, external to said at least one first rank, are tangent to said first circumference;

wherein outer radial edges of all the pin elements of said second rank of pin elements of the intermediate ranks, are tangent to a second circumference;

wherein inner radial edges of all the pin elements of said third further rank of pin elements of the intermediate ranks, external to said at least one second rank, are tangent to said second circumference.

11. The ventilated braking band of claim 10, wherein said inner side surface of said first plate is planar and said facing inner side surface of the facing plate is planar.

12. The ventilated braking band of claim 11, wherein said pin elements having said at least partial circular cross section have said at least partial circular cross section at least partially along their axial length from said inner side surface of said first plate to said facing inner side surface of the facing plate.

13. The ventilated braking band of claim 11, wherein said pin elements having said rhomboidal cross section have said rhomboidal cross section at least partially along their axial length from said inner side surface of said first plate to said facing inner side surface of the facing plate.

14. The ventilated braking band of claim 11, wherein all of said pin elements extend transverse along their axial lengths beginning where a root portion of each pin element connects directly to said inner side surface of said first plate to where a terminal portion of each pin element connects directly to said facing inner side surface of the facing plate.

15. A ventilated braking band of a disc for a disc brake, wherein
said braking band comprises two plates;
said two plates comprise two inner planar side surfaces which are arranged facing each other;
said two inner side surfaces are mutually spaced apart forming a ventilation duct for permitting a cooling air flow between the two plates;
said two plates are connected to each other via at least pin elements which project from an inner side surface of a first plate to reach the facing inner side surface of the facing plate;
said pin elements are a plurality of pin elements distributed circumferentially in uniform manner to form circular ranks, forming a rank of inner pin elements arranged closer to the rotation axis, a rank of outer pin elements arranged further from the rotation axis, and ranks of intermediate pin elements;
the pin elements of ranks arranged close to each other are circumferentially staggered so that, following a radial direction with respect to the rotation axis, each pin element of any rank is located between two pin elements of the adjacent rank;
the pin elements have a cross section in a median plane parallel to the fluid flow in the ventilation duct;
wherein
the pin elements of the intermediate ranks comprise:
at least one first rank of pin elements of the intermediate ranks with pin elements closer to said rotation axis having a circular cross section at said median plane, forming a circumference-shaped cross section edge;
at least one second further rank of pin elements of the intermediate ranks external to said at least one first rank with pin elements having a rhomboidal cross section at said median plane, forming a rhombus-shaped cross section edge;
at least one third rank of pin elements of the intermediate ranks external to said least one second rank with pin elements having a circular cross section at said median plane, forming a circumference-shaped cross section edge; wherein
wherein all of said pin elements extend transverse along their axial lengths beginning where a root portion of each pin element connects directly to said planar inner side surface of said first plate to where a terminal portion of each pin element connects directly to said planar facing inner side surface of the facing plate;
wherein outer radial edges of the pin elements of the immediately adjacent ranks and inner pin elements do not circumferentially overlap inner radial edges of other pin elements of the ranks;
wherein outer radial edges of all the pin elements of said first rank of pin elements of the intermediate ranks, closer to said rotation axis, are tangent to a first circumference;
wherein inner radial edges of all the pin elements of said second further rank of pin elements of the intermediate ranks, external to said at least one first rank, are tangent to said first circumference;
wherein outer radial edges of all the pin elements of said second rank of pin elements of the intermediate ranks, are tangent to a second circumference;
wherein inner radial edges of all the pin elements of said third further rank of pin elements of the intermediate ranks, external to said at least one second rank, are tangent to said second circumference.

* * * * *